UNITED STATES PATENT OFFICE.

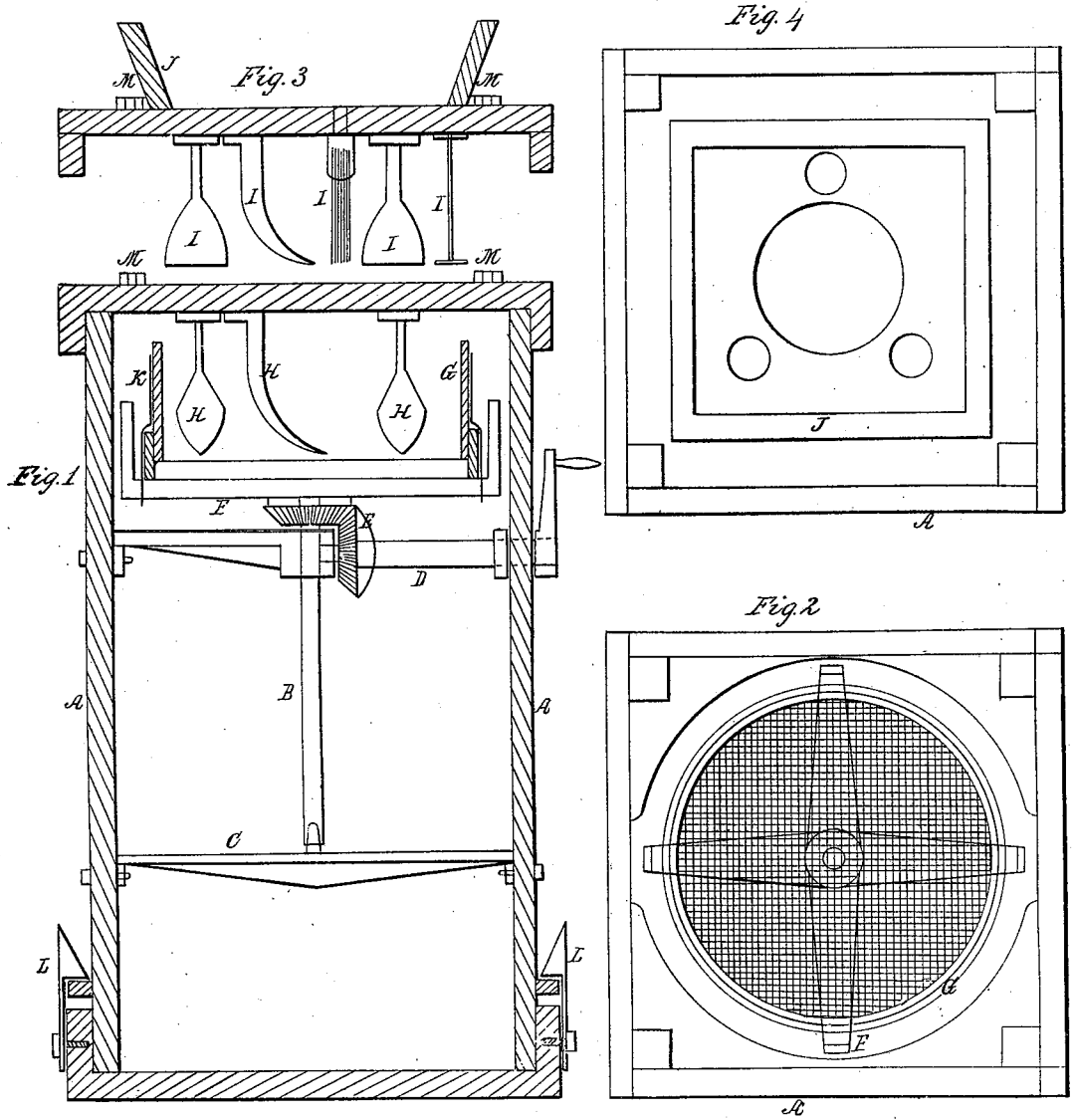

MELLEN BATTEL, OF ALBANY, NEW YORK.

COAL-SIFTER.

Specification of Letters Patent No. 25,877, dated October 25, 1859.

*To all whom it may concern:*

Be it known that I, MELLEN BATTEL, of the city and county of Albany and State of New York, have invented a new and useful Improvement in Horizontal Revolving Sieves and Stationary Plows, Rubbers, and Brushes.

These plows and rubbers are so arranged as to agitate every substance on the whole bottom or surface of the sieve, at every revolution, with much greater ease and force than by shaking; and I do hereby declare that the following is a full, clear, and exact description of the same, reference being had to the accompanying drawings, forming part of this specification, in which—

Figure 1 is a vertical section with my improvements applied. Fig. 2 is a horizontal section of the same, showing the sieve, and the arms that carry the sieve. Fig. 3 is an edge view of the top, or lid that is slipped on when sifting sand or other substance, showing the stationary rubbers, brushes, scraper and hopper when the sand is thrown in. Fig. 4 is a horizontal section of the same.

Similar letters of reference indicate corresponding parts in the four figures.

My invention consists in the employment in the vertical section Fig. 1, of an upright or vertical shaft, turning on a pivot below, fastened to a cross bar attached to the sides of the box A. On the top of said vertical shaft, is a bevel or miter wheel together with four arms upon which the sieve revolves. Connected with this shaft is a horizontal shaft and bevel or miter wheel, working into the bevel on the upright shaft, hanging on a cross-bar fastened to the outside shell of the box, the upright shaft passing through the same. On the outer end of the horizontal shaft, is a crank for the purpose of putting the sieve in motion. Above this sieve is suspended from the top or lid of the box, 1, 2, 3 or more stationary plows, placed in such position as to agitate or put in motion, the coal or other substance of the whole surface of the bottom of the sieve at every revolution, to cause the dirt or sand to fall below by its own gravity. I also employ in this box a top, or lid, as shown Fig. 3—made, the top part in the form of a hopper with any number of stationary brushes, or rubbers, or scrapers, suspended from the under side of the lid or hopper, extending down near the bottom of the sieve, as shown in Fig. 1—made in the form of a shovel or tea scoop.

The plows, as shown in Fig. 1, as the sieve revolves, point forward like a colter to stir, or agitate or move the coal, but when the top or lid, Fig. 3, is applied for sifting sand or other substance, the rubbers or scoops are placed the reverse, with their backs forward in a rubbing position. When the bottom of this box is filled up, the bottom, which is a box, by turning the latch L falls off in many positions or situations. This bottom may be dispensed with. The outside shell of this sifter may be made of iron in a cylindrical form, and the sieve be driven by hand or steam power.

To enable others skilled in the art to make and use my invention, I will proceed to describe its construction and operation.

A, is the outer shell of the box; B, is the vertical shaft; C, the cross bar and pivot the shaft turns on; D, the counter shaft and crank; E, the bevel or miter wheel; F, the arm that the sieve revolves on; G, the sieve— any kind, fine or coarse, may be used; H, H, H, the stationary plows, that agitate the coal; I, I, I, the stationary rubbers and brushes and T scraper shown in Fig. 3, which mashes the lumps and rubs them through the sieve; J, the hopper when the sand is thrown in; K, the straps on the side of the sieve, extending below the arm, to cause the sieve to revolve; M, the hinges that the two lids are hung by, shown Figs. 1 and 3.

These sieves are taken out with great ease and replaced or others put in their stead.

I do not claim the common sieve, but

I claim—

The stationary plows and brushes and rubbers in combination with the horizontal revolving sieve as hereinbefore described and set forth, and made to operate.

MELLEN BATTEL.

Signed in the presence of—
JOHN COSTIGAN,
JOHN J. BURTON.